US009503943B2

United States Patent
Ghai (10) Patent No.: US 9,503,943 B2
(45) Date of Patent: Nov. 22, 2016

(54) COMBINATION CELLULAR AND WI-FI HARDWARE DEVICE

(71) Applicant: BENU NETWORKS, INC., Billerica, MA (US)

(72) Inventor: Rajat Ghai, Sandwich, MA (US)

(73) Assignee: Benu Networks, Inc., Billerica, MA (US)

( * ) Notice: Subject to any disclaimer, the term of this patent is extended or adjusted under 35 U.S.C. 154(b) by 78 days.

(21) Appl. No.: 14/523,298

(22) Filed: Oct. 24, 2014

(65) Prior Publication Data

US 2015/0117409 A1 Apr. 30, 2015

Related U.S. Application Data

(60) Provisional application No. 61/895,464, filed on Oct. 25, 2013, provisional application No. 61/924,438, filed on Jan. 7, 2014.

(51) Int. Cl.
*H04W 36/14* (2009.01)
*H04W 36/00* (2009.01)
*H04W 84/12* (2009.01)
(Continued)

(52) U.S. Cl.
CPC ...... *H04W 36/0066* (2013.01); *H04L 41/0816* (2013.01); *H04L 67/10* (2013.01); *H04W 48/17* (2013.01); *H04W 84/12* (2013.01); *H04W 36/14* (2013.01)

(58) Field of Classification Search
CPC ...................... H04W 72/0433; H04L 41/0816
USPC ...................................... 370/331, 389; 726/4
See application file for complete search history.

(56) References Cited

U.S. PATENT DOCUMENTS 8,818,329 B2 * 8/2014 Udeshi .............. H04W 52/0258
370/328
9,025,579 B2 * 5/2015 Kwon ................. H04W 76/026
370/338
(Continued)

OTHER PUBLICATIONS

Hill et al., "MICA: A Wireless Platform for Deeply Embedded Networks" IEEE Nov.-Dec. 2002., Retrieved on [Dec. 29, 2014]. Retrieved from: <URL: http://www.eecs.berkeley.edu/-culler/cs294-f03/papers/micaarch> entire document.
(Continued)

*Primary Examiner* — Charles C Jiang
*Assistant Examiner* — Emmanuel Maglo
(74) *Attorney, Agent, or Firm* — Sean D. Detweiler, Esq.; Morse, Barnes-Brown & Pendleton, P.C.

(57) ABSTRACT

A combination cellular and Wi-Fi hardware device has an IP interface that is configured to communicate with a first cellular network, a Wi-Fi network, or both. The combination cellular and Wi-Fi hardware device is configured to provide the network functionality (e.g., virtualized network cloud) that is required to facilitate communication and data flow between the IP interface and either a second cellular network or a cloud computing infrastructure network. The IF interface is accessed using a single IP address by a mobile device in wireless communication with the combination cellular and Wi-Fi hardware device. The single IP address is maintained when the mobile device switches between using the first cellular network and the Wi-Fi network to communicate with the combination cellular and Wi-Fi hardware device, and vice versa.

15 Claims, 9 Drawing Sheets

(51) Int. Cl.
*H04L 12/24* (2006.01)
*H04L 29/08* (2006.01)
*H04W 48/00* (2009.01)

(56) References Cited

U.S. PATENT DOCUMENTS

| | | | |
|---|---|---|---|
| 9,198,021 B2* | 11/2015 | Tomici | H04W 8/082 |
| 2006/0104262 A1 | 5/2006 | Kant et al. | |
| 2007/0205881 A1* | 9/2007 | Breed | B60C 23/0433 340/447 |
| 2008/0205342 A1 | 8/2008 | Radhakrishnan et al. | |
| 2009/0262733 A1* | 10/2009 | Olson | H04L 12/66 370/389 |
| 2009/0285175 A1* | 11/2009 | Nix | H04L 29/125 370/331 |
| 2010/0069035 A1* | 3/2010 | Johnson | H04W 4/02 455/404.1 |
| 2011/0004876 A1 | 1/2011 | Wu et al. | |
| 2012/0063301 A1* | 3/2012 | Schel | H04W 36/26 370/225 |
| 2012/0230293 A1* | 9/2012 | Grinshpun | H04W 36/0016 370/331 |
| 2012/0300772 A1 | 11/2012 | Manzella et al. | |
| 2013/0097674 A1* | 4/2013 | Jindal | G06F 15/16 726/4 |
| 2013/0138814 A1 | 5/2013 | Kotecha | |
| 2013/0142095 A1* | 6/2013 | Calcev | H04W 52/0219 370/311 |
| 2013/0204987 A1 | 8/2013 | Patani et al. | |
| 2013/0339498 A1* | 12/2013 | Johnson | H04W 4/02 709/221 |
| 2014/0148152 A1* | 5/2014 | Periyalwar | H04W 76/025 455/426.1 |
| 2014/0160937 A1* | 6/2014 | Richards | H04W 12/06 370/236 |
| 2014/0213219 A1* | 7/2014 | Mohebbi | H04W 92/02 455/411 |
| 2014/0248862 A1* | 9/2014 | Periyalwar | H04W 48/18 455/418 |
| 2014/0269610 A1* | 9/2014 | Hiben | H04W 36/14 370/331 |

OTHER PUBLICATIONS

Network Functions Virtualisation—An Introduction, Benefits, Enablers, Challenges & Call for Action. Oct. 22-24, 2012 at the "SDN and OpenFlow World Congress", Darmstad-Germany.
International Search Report for International Application PCT/US2014/062197, dated Feb. 9, 2015.
International Search Report for International Application PCT/US2014/062205, dated Feb. 3, 2015.

* cited by examiner

COMBINATION CELLULAR AND WI-FI HARDWARE DEVICE

CROSS-REFERENCE TO RELATED APPLICATION

This application claims priority to, and the benefit of co-pending U.S. Provisional Application No. 61/895,464, filed Oct. 25, 2013 and U.S. Provisional Application No. 61/924,438, filed Jan. 7, 2014, for all subject matter contained in both applications. The disclosures of said provisional applications are hereby incorporated herein by reference in their entirety.

FIELD OF THE INVENTION

The present invention relates to cellular and Wi-Fi systems suitable for providing for communication and data flow with mobile devices, and more particularly to a single combination cellular and Wi-Fi hardware device that can utilize a cellular network, a Wi-Fi network, or a combination of both to provide for communication and data flow with mobile devices.

FIELD OF THE INVENTION

The present invention relates to cellular and Wi-Fi systems suitable for providing for communication and data flow with mobile devices, and more particularly to a single combination cellular and Wi-Fi hardware device that can utilize a cellular network, a Wi-Fi network, or a combination of both to provide for communication and data flow with mobile devices.

BACKGROUND OF THE INVENTION

There are conventional cellular and Wi-Fi systems that can provide for communication and data flow with mobile devices (e.g., smartphones and tablets) using either a cellular network (via cellular sub-system) or a Wi-Fi network (via Wi-Fi sub-system). Conventional cellular and Wi-Fi systems include a number of devices each having a specific single function or purpose. The conventional cellular and Wi-Fi systems are typically complex (e.g., having many nodes and protocols) and requiring relatively high capital expenditure and recurring operating and maintenance expenses.

The network devices within conventional cellular and Wi-Fi systems can include, for example, a home eNodeB gateway (HeNB-GW)/security gateway (Se-GW), mobility management entity (MME), serving gateway (S-GW), trusted wireless access gateway (T-WAG), packet data network gateway (P-GW), and traffic detection function (TDF). These network devices each have different and particular network functions for the handling and processing of communication and data flow between mobile devices and a cellular network or cloud computing infrastructure network (e.g., Internet provider network). Different combinations of these network devices are used when the mobile device interacts with a cellular network versus the mobile device interacting with a Wi-Fi network. For example, the mobile device utilizing the Wi-Fi network receives data from a cloud computing infrastructure network via the Wi-Fi sub-system that includes the T-WAG device in connection with P-GW and TDF devices. In contrast, the mobile device utilizing a first cellular network receives data from a cloud computing infrastructure network or second cellular network via a cellular sub-system that includes MME and S-GW devices in connection with P-GW and TDF devices.

The conventional cellular and Wi-Fi system can include network servers or databases in communication with specific network devices. For example, the MME device can be connected to a home subscriber server (HSS) which communicates with an authentication, authorization, and accounting (AAA) server. The P-GW and TDF devices can be connected to a policy and charging rules function (PCRF) server, an online charging server (OCS), and a charging gateway function (CFG) server. The TWAG device can be connected to an AAA server as well.

Different types of ports (e.g., S6a, S11, S5, Gx, Gy, Gz, SGi, and S2a) connect the network devices and network servers to one another providing specific pathways for the communication and data flow within the conventional cellular and Wi-Fi system. Since multiple network devices, along with multiple network servers, are interconnected to provide the overall functionality for the conventional cellular and Wi-Fi system, the communication and data flow can be easily disrupted (e.g., due to network device malfunctions or damaged ports between network devices). In addition, the many different devices required to implement such functionality require service costs and capital expenditures to establish and maintain.

SUMMARY

There is a need for a single device that can provide for communication and data flow with a mobile device utilizing a Wi-Fi network, a cellular network, or a combination of both. There is a need for a single device that can provide smooth switching (i.e., ultra-fast mobility) between utilizing the cellular network and Wi-Fi network.

The present invention combination cellular and Wi-Fi hardware device provides a solution to these needs, in addition to other characteristics as described herein and appreciable by those of skill in the art. The combination cellular and Wi-Fi hardware device is an integrated cellular and Wi-Fi core platform. The combination cellular and Wi-Fi hardware device can provide Wi-Fi/cellular integration capabilities such as cellular to Wi-Fi fast handover (switching) and a combination cellular/Wi-Fi hotspot. As a single combination cellular and Wi-Fi hardware device, there are fewer interfaces and nodes, thus providing capital expenditure savings.

In accordance with an example embodiment of the present invention, a combination cellular and Wi-Fi hardware device is provided. The combination cellular and Wi-Fi hardware device can include an IP interface configured for communication with a first cellular network, a Wi-Fi network, or both. The combination cellular and Wi-Fi hardware device can be configured to provide the required network functionality to facilitate communication and data flow between the IP interface and either a second cellular network, or a cloud computing infrastructure network. The IP interface can be accessed using a single IP address by a mobile device in wireless communication with the combination cellular and Wi-Fi hardware device. The single IP address can be maintained when the mobile device switches between utilizing the first cellular network and the Wi-Fi network to communicate with the combination cellular and Wi-Fi hardware device, and vice versa.

In accordance with aspects of the present invention, the first cellular network can be a long term evolution (LTE) radio access network (RAN). The first cellular network can be provided by an evolved NodeB antenna.

In accordance with aspects of the present invention, the IP interface can include an interworking function module configured to direct and interwork communication from the first cellular network to a cellular and Wi-Fi control plane module of the IP interface. The cellular and Wi-Fi control plane module can be a generic IP signaling protocol module configured to assign the single IP address to the mobile device.

In accordance with aspects of the present invention, the IP interface can include a wireless application gateway (WAG) manager module in communication with the interworking function module. The IP interface can include a cellular and Wi-Fi control plane module configured to receive communication from the Wi-Fi network.

In accordance with aspects of the present invention, the mobile device can utilize the first cellular network and the Wi-Fi network concurrently to facilitate communication and data flow between the combination cellular and Wi-Fi hardware device and the mobile device. The first cellular network can include an LTE-Advanced protocol network.

In accordance with aspects of the present invention, the second cellular network can include a 3G radio access network. The cloud computing infrastructure network can include an Internet provider network.

In accordance with one aspect of the present invention, switching between utilizing a first cellular network and a Wi-Fi network can occur at about 50 microseconds or less.

In accordance with aspects of the present invention, the IP interface can include an authenticating module that authenticates the single IP address of the mobile device such that when the mobile device switches between utilizing the first cellular network and the Wi-Fi network, or vice versa, no additional authentication is required. The IP interface can include a fast path module configured to provide a common fast path for communication and data flow along both the first cellular network and the Wi-Fi network.

In accordance with one aspect of the present invention, the combination cellular and Wi-Fi hardware device can include one or more of virtualized network modules that provide the network functionality of a mobility management entity (MME), a serving gateway (S-GW), a trusted wireless access gateway (T-WAG), a packet data network gateway (P-GW), a traffic detection function (TDF), a authentication, authorization, and accounting protocol (AAA) server, a home subscriber server (HSS), a policy and charging rules function (PCRF) server, an online charging server (OCS), and a charging gateway function (CFG) server.

In accordance with an example embodiment of the present invention, a computer implemented method of using a combination cellular and Wi-Fi hardware device to provide for communication and data flow with a mobile device is provided. An IP interface of the combination cellular and Wi-Fi hardware device communicates with a first cellular network, a Wi-Fi network, or both. The mobile device accesses the IP interface using a single IP address. The mobile device wirelessly communicates with the combination cellular and Wi-Fi hardware device. The combination cellular and Wi-Fi hardware device provides network functionality facilitating communication and data flow between the IP interface and either a second cellular network, or a cloud computing infrastructure network. The combination cellular and Wi-Fi hardware device maintains the single IP address when the mobile device switches between utilizing the first cellular network and the Wi-Fi network to communicate with the combination cellular and Wi-Fi hardware device, and vice versa.

BRIEF DESCRIPTION OF THE FIGURES

These and other characteristics of the present invention will be more fully understood by reference to the following detailed description in conjunction with the attached drawings, in which.

DETAILED DESCRIPTION

An illustrative embodiment of the present invention relates to a combination cellular and Wi-Fi hardware device and method of using the combination cellular and Wi-Fi hardware device to provide for communication and data flow with a mobile device. The combination cellular and Wi-Fi hardware device includes an IP interface that communicates with a first cellular network, a Wi-Fi network, or both. The combination cellular and Wi-Fi hardware device can provide the network functionality required to facilitate communication and data flow between the IP interface and either a second cellular network or a cloud computing infrastructure network. The IP interface is accessed by a mobile device via wireless communication. A single IP address of the mobile device is used to access and communicate with the IP interface whether the mobile device is using the first cellular network, Wi-Fi network, or combinations of both.

As described above, network devices and network servers were utilized to provide the network functionality necessary to facilitate communication and data flow between a mobile device and a second cellular network or cloud computing infrastructure network. The combination cellular and Wi-Fi hardware device collapses and virtualizes the network functions of the network devices and network servers within a virtualized network cloud of the single combination cellular and Wi-Fi hardware device. Collapsing and virtualizing the network functions allows for the IP interface to act as a common anchor point between the mobile device and the network functions. Having all of the functions collapsed into a single combination cellular and Wi-Fi hardware device with the IP interface acting as a common anchor point allows for the combination cellular and Wi-Fi hardware device to communicate with both networks (first cellular network and Wi-Fi network).

These features enable smooth and fast switching between a first cellular network and Wi-Fi network. The feature of utilizing the same single IP address for both the first cellular network and the Wi-Fi network allows the mobile device to maintain communication with the combination cellular and Wi-Fi hardware device while quickly switching (i.e., fast mobility) between the first cellular network and the Wi-Fi network. Thus, the communication and data flow to or from either a second cellular network or a cloud computing infrastructure network is maintained without being interrupted during switching. Also, these features (collapsed/virtualized network functions, IP interface acting as a common anchor point, and single IP address for both first cellular network and Wi-Fi network) enable simultaneous communication with first cellular network and Wi-Fi network (i.e., carrier aggregation).

FIGS. 1 through 9, wherein like parts are designated by like reference numerals throughout, illustrate a combination cellular and Wi-Fi hardware device, and its corresponding use, according to the present invention. Although the present invention will be described with reference to the figures, it should be understood that many alternative forms can embody the present invention. One of skill in the art will appreciate different ways to alter the parameters disclosed, such as the size, shape, or type of elements or materials, in a manner still in keeping with the spirit and scope of the present invention.

Figure 1:
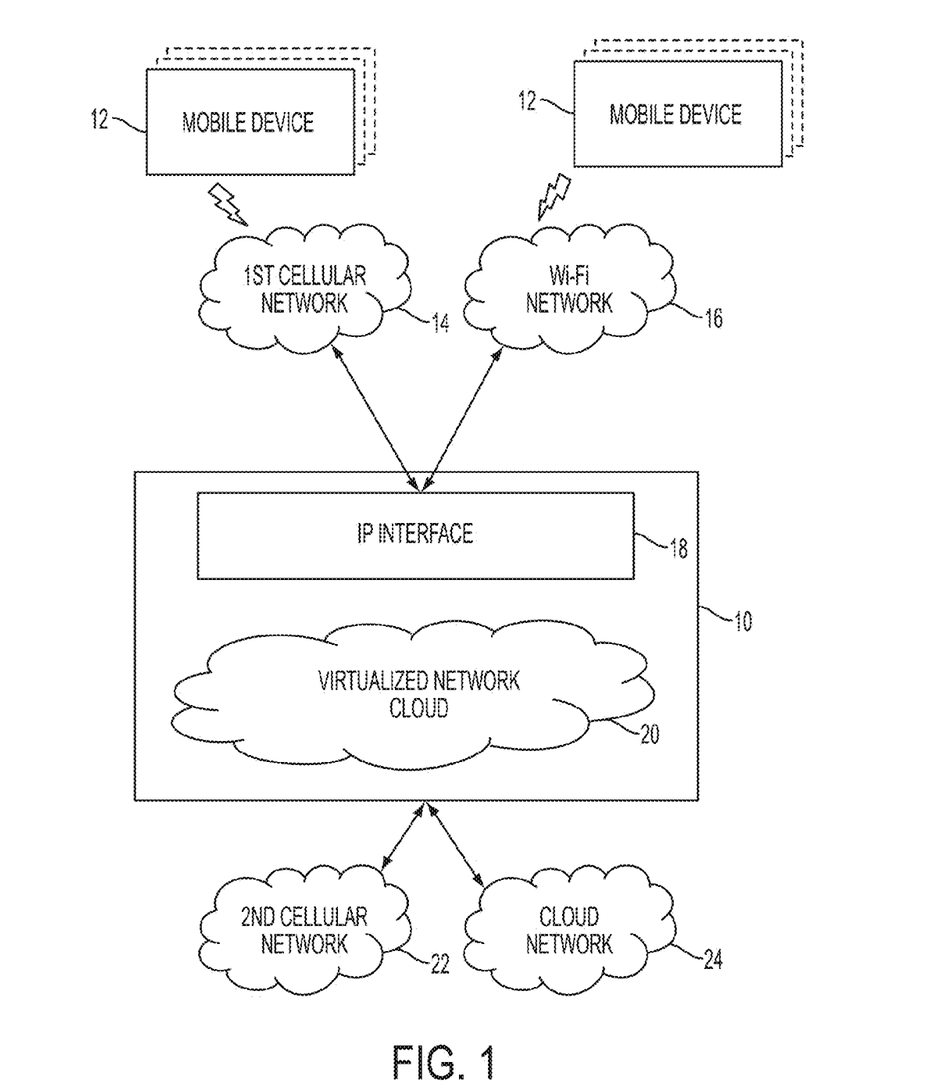
FIG. 1 is a schematic illustration of a combination cellular and Wi-Fi hardware device in communication with multiple mobile devices, according to an embodiment of the present invention.

FIG. 1 depicts a combination cellular and Wi-Fi hardware device 10 that communicates with mobile devices 12 across either a first cellular network 14 or a Wi-Fi network 16. The combination cellular and Wi-Fi hardware device 10 includes an IP interface 18 that communicates directly with the first cellular network 14, Wi-Fi network 16, or both. The combination cellular and Wi-Fi hardware device includes a virtualized network cloud 20 (e.g., distributed management environment (DME) monitoring network and controlling protocol) that can provide the necessary network functions to facilitate communication and data flow between the IP interface 18 and either a second cellular network 22 or a cloud computing infrastructure network 24. The virtualized network cloud 20 replaces the various network devices and network servers used in conventional cellular and Wi-Fi systems.

As a unified platform, the combination cellular and Wi-Fi hardware device 10 can offer exceptional scalability (for example about 3 million concurrently active devices at about 400 Gb/s per 6 rack units (RU) chassis) allowing for higher service intelligent performance. Those of skill in the art will appreciate other example ranges of concurrently active devices that can be used with the combination cellular and Wi-Fi hardware device 10 for a range of Gb/s per RU chassis. The combination cellular and Wi-Fi hardware device 10 can provide significant space and power savings compared with conventional cellular and Wi-Fi systems (e.g., about 90% savings in power, space, and cooling compared with conventional cellular and Wi-Fi systems). In one example, the combination cellular and Wi-Fi hardware device 10 can interact with as many as about 2 million Wi-Fi networks 16 and/or first cellular networks 14 (i.e., about 2 million concurrent mobile devices 12 that use first cellular network 14 and/or Wi-Fi network 16).

Figure 2:
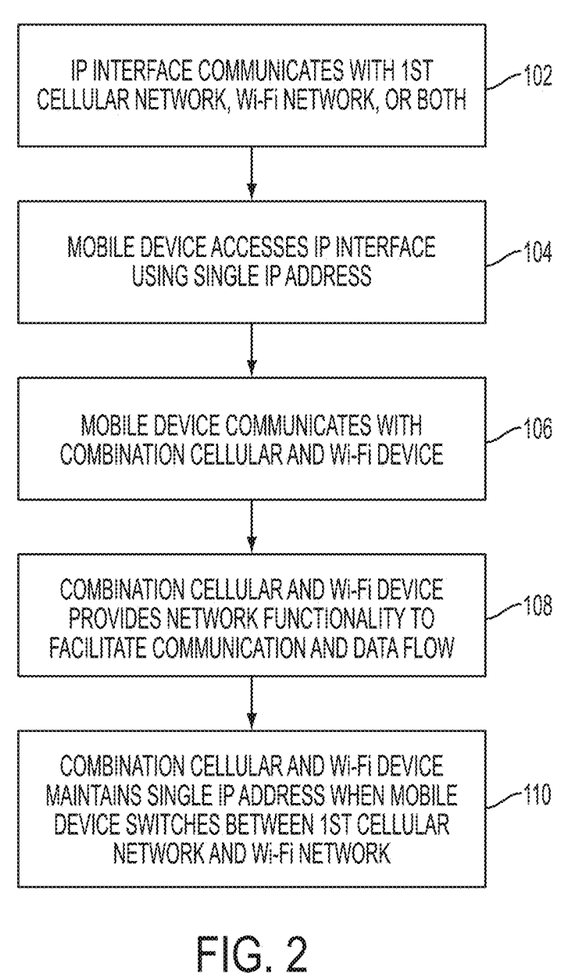
FIG. 2 is a flow chart illustration of a method for using the combination cellular and Wi-Fi hardware device of FIG. 1, according to an embodiment of the present invention.

FIG. 2 depicts a flow chart displaying the computer implemented steps for using a combination cellular and Wi-Fi hardware device 10 to provide for communication and data flow with a mobile device 12. In step 102, the IP interface 18 communicates with a first cellular network 14, Wi-Fi network 16, or both. The mobile device 12 accesses the IP interface 18 using a single IP address (i.e., enabling the IP interface to be an anchor point) (step 104). In step 106, the mobile device 12 wirelessly communicates with the combination cellular and Wi-Fi hardware device 10. The combination cellular and Wi-Fi hardware device 10 provides network functionality, using virtualized functions, to facilitate communication and data flow between the IP interface 18 and either a second cellular network 22 or a cloud computing infrastructure network 24 (step 108). In step 110, the combination cellular and Wi-Fi hardware device 10 maintains the single IP address when the mobile device 12 switches between utilizing the first cellular network 14 and the Wi-Fi network 16 to communicate with the combination cellular and Wi-Fi hardware device 10, and vice versa.

Figure 3:
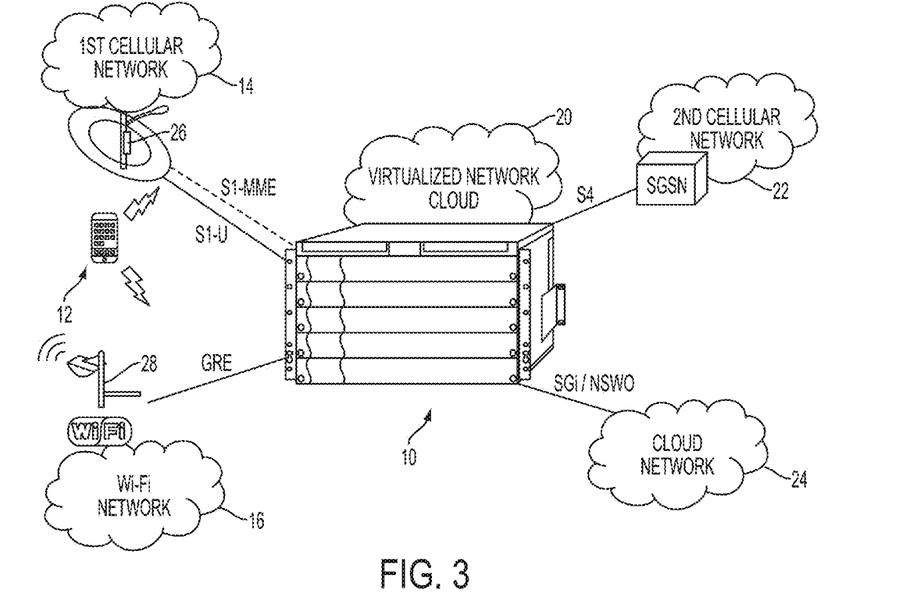
FIG. 3 is a schematic illustration of a combination cellular and Wi-Fi hardware device providing for communication and data flow between a mobile device and either a second cellular network or a cloud computing infrastructure network using a first cellular network and/or Wi-Fi network, according to one aspect of the present invention.

FIG. 3 depicts an example combination cellular and Wi-Fi hardware device 10 providing for communication and data flow with a mobile device 12 via a first cellular network 14 and/or a Wi-Fi network 16. The first cellular network 14 can be a long term evolution (LTE)/small cells radio access network (RAN) (i.e., 4G LTE), 3G LTE, LTE advanced (LTE-A) protocol network, or any other cellular network appreciated by one of skill in the art. The first cellular network 14 can be provided by a cellular antenna 26 (e.g., evolved node B (eNodeB) antenna) that communicates between the combination cellular and Wi-Fi hardware device 10 and the mobile device 12. The Wi-Fi network 16 can be provided by a wireless access point 28 that communicates between the combination cellular and Wi-Fi hardware device 10 and the mobile device 12. As described above, data is provided to the mobile device 12 from the combination cellular and Wi-Fi hardware device 10 (via first cellular network 14 or Wi-Fi network 16). The combination cellular and Wi-Fi hardware device 10 receives the data from a second cellular network 22 (e.g., 3G RAN from a Serving GPRS Support Node) or cloud computing infrastructure network 24 (e.g., Internet provider network). As shown in FIG. 3, the combination cellular and Wi-Fi hardware device 10 has different types of ports (e.g., S4 to second cellular network 22, SGi/NSWO to cloud computing infrastructure network 24, S1-MME and S1-U to first cellular network 14, and Generic Routing Encapsulation (GRE) to Wi-Fi network) to enable directing of communication and data flow to or from the second cellular network 22 or cloud computing infrastructure network 24 to the mobile device 12. These ports can be physical ports or virtualized ports.

Figure 4:
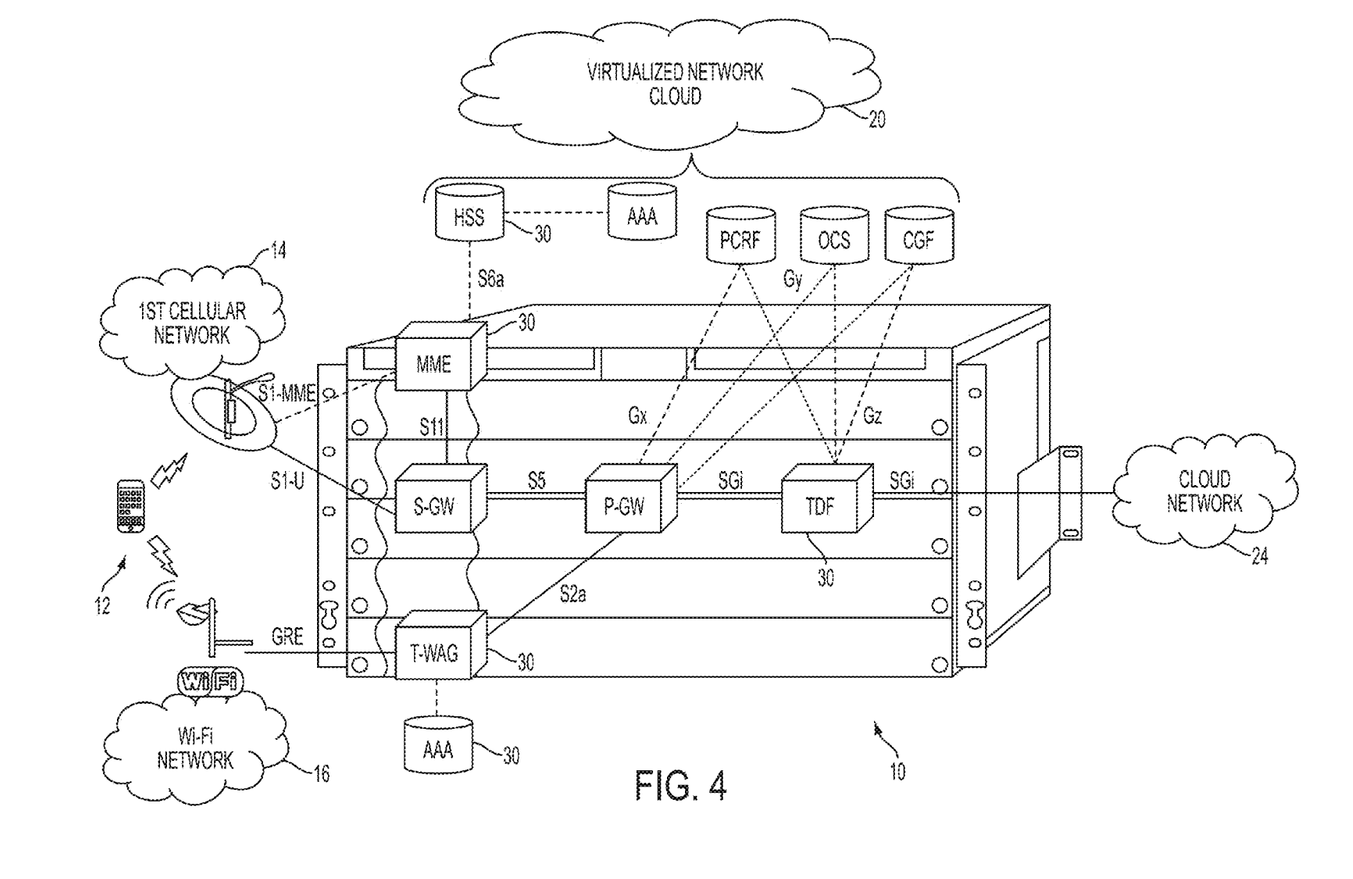
FIG. 4 is a schematic illustration of interconnected virtualized network modules, in the virtualized network cloud of the combination cellular and Wi-Fi hardware device, each providing a distinct network functionality for handling and processing communication and data flow between the cloud computing infrastructure and the mobile device, according to one aspect of the present invention.

The virtualized network cloud 20 replaces and performs the network functions of the various interconnected network devices and network servers (i.e., collapsing network functions into one platform) that are needed to facilitate wireless communication and data flow between the mobile device 12 and the cloud computing infrastructure network 24 or second cellular network 22. For example, as shown in FIG. 4, the virtualized network cloud 20 includes virtualized network modules 30 that can each perform a different network function. In particular, each virtualized network module 30 can be configured to perform the network functionality of various components, including MME, S-GW, T-WAG, P-GW, TDF, HSS, AAA, PCRF, OCS, and CGF. These virtualized network modules 30 are interconnected to each other via virtual ports (e.g., S6a, S11, S5, Gx, Gy, Gz, SGi, and S2a). One of skill in the art will appreciate other combinations of virtualized network modules 30 as necessary for the combination cellular and Wi-Fi hardware device 10 to provide for communication and data flow with the mobile devices 12.

Figure 5:
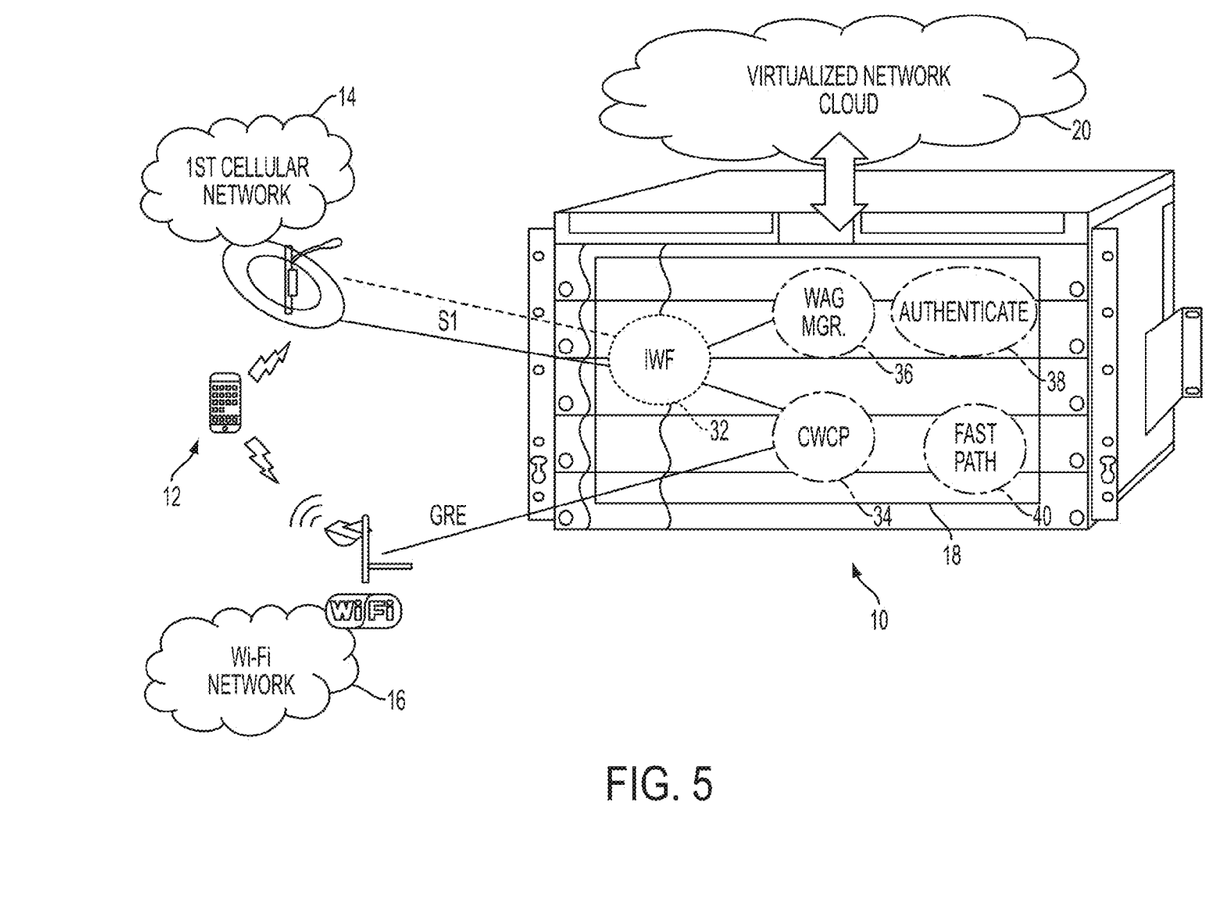
FIG. 5 is a schematic illustration of the components of an Internet Protocol (IP) interface collapsed within the combination cellular and Wi-Fi hardware device, according to one aspect of the present invention.

FIG. 5 depicts an IP interface 18 of the combination cellular and Wi-Fi hardware device 10 in communication with a mobile device 12 utilizing the first cellular network 14 and/or the Wi-Fi network 16. The IP interface 18 provides a common anchor point for allowing communication with both the first cellular network 14 and the Wi-Fi network 16. The IP interface 18 includes modules that function in combination with the virtualized network cloud 20 to provide for communication and data flow with the mobile device 12.

Within the IP interface 18, an interworking function (IWF) module 32 directs and interworks (e.g., converting signals) communication (e.g., LTE transport signaling) from the first cellular network 14 to a cellular and Wi-Fi control plane (CWCP) module 34. Communication from the first cellular network 14 can be received by the IWF module 32 (i.e., acting as a gateway) via an S1 port. The IWF module 32 converts the communication from the first cellular network 14 such that the communication can be understood by the cellular and Wi-Fi control plane (CWCP) module 34 for further processing.

The CWCP module 34 can receive communications directly from the Wi-Fi network 16 with no need for conversion. Thus, the CWCP functions as a common control plane for the first cellular network 14, after conversion via IWF module 32, and the Wi-Fi network 16 directly. In one example, the cellular and Wi-Fi control plane module 34 can be a generic IP signaling protocol module (e.g., dynamic host configuration protocol (DHCP) server with IP GRE) that can assign a single IP address to a mobile device 12.

The IP interface 18 includes a wireless application gateway (WAG) manager module 36 that communicates with the IWF module 32. The WAG manager module 36 is a server-based gateway that can provide wireless access to enterprise applications. An authenticating module 38 and fast path module 40 are in the IP interface 18. The authenticating module 38 (e.g., AAA client manager) can authenticate the single IP address of the mobile device 12 and/or the mobile device 12 itself such that when the mobile device 12 switches between utilizing the first cellular network 14 and the Wi-Fi network 16, or vice versa, no additional authentication is required. The fast path module 40 can process communication and data flow with both the first cellular network 14 and the Wi-Fi network 16 thus providing a common fast path for the first cellular network 14 and Wi-Fi network 16. These IP interface modules (particularly the IWF module 32 and CWCP module 34) together allow for the IP interface 18 to act as a common anchor point (i.e., IP anchor point doesn't change, nor does the IP address) for both the first cellular network 14 and Wi-Fi network 16.

Figure 6:
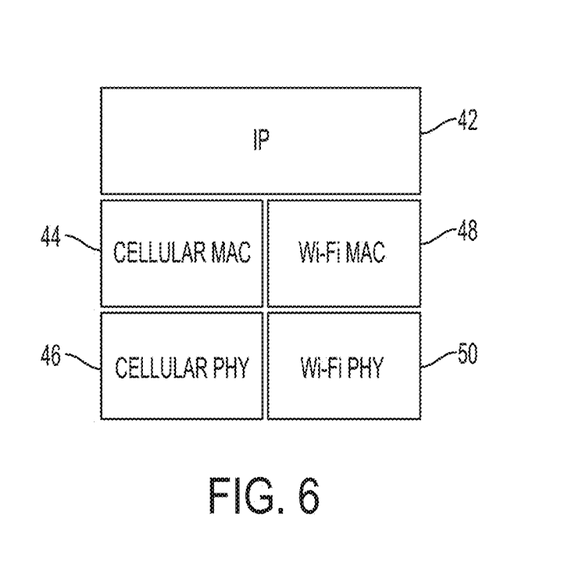
FIG. 6 is a schematic illustration of an open systems interconnection (OSI) model for the communication between the combination cellular and Wi-Fi hardware device and a mobile device having a single Internet Protocol (IP) address for both a cellular network communication and a Wi-Fi network communication, according to one aspect of the present invention.

FIG. 6 depicts an open systems interconnection (OSI) model for the communication between the combination cellular and Wi-Fi hardware device 10 and the mobile device 12. The OSI model depicts the media layers (network layer, data link layer, and physical layer) of the communication between the combination cellular and Wi-Fi hardware device 10 and the mobile device 12. A single Internet Protocol (IP) address 42 within the network layer is assigned to the mobile device 12 when using either a cellular network or Wi-Fi network. When the communication is via the cellular network, the IP address 42 corresponds with a cellular media access control (MAC) address 44 in the data link layer and a cellular physical (PHY) address 46 in the physical layer. When the communication is via the Wi-Fi network, the same IP address 42 corresponds with a Wi-Fi MAC address 48 in the data link layer and a Wi-Fi PHY address 50 in the physical layer. When the communication is using both the cellular network and Wi-Fi network, the IP address 42 corresponds with both sets of cellular addresses (cellular MAC address 44 and cellular PHY address 46) and Wi-Fi addresses (Wi-Fi MAC address 48 and Wi-Fi PHY address 50). This allows a mobile device 12 to access the IP interface 18 using the first cellular network 14 and/or Wi-Fi network 16 with the same IP address 42. Access and authentication can be maintained (i.e., IP binding maintained) with the same IP address 42 even if the mobile device 12 switches between networks 14, 16. This arrangement allows for the combination cellular and Wi-Fi hardware device 10 to treat mobile devices 12 as multi homed (e.g., GTP MAC, GRE MAC).

Figure 7:
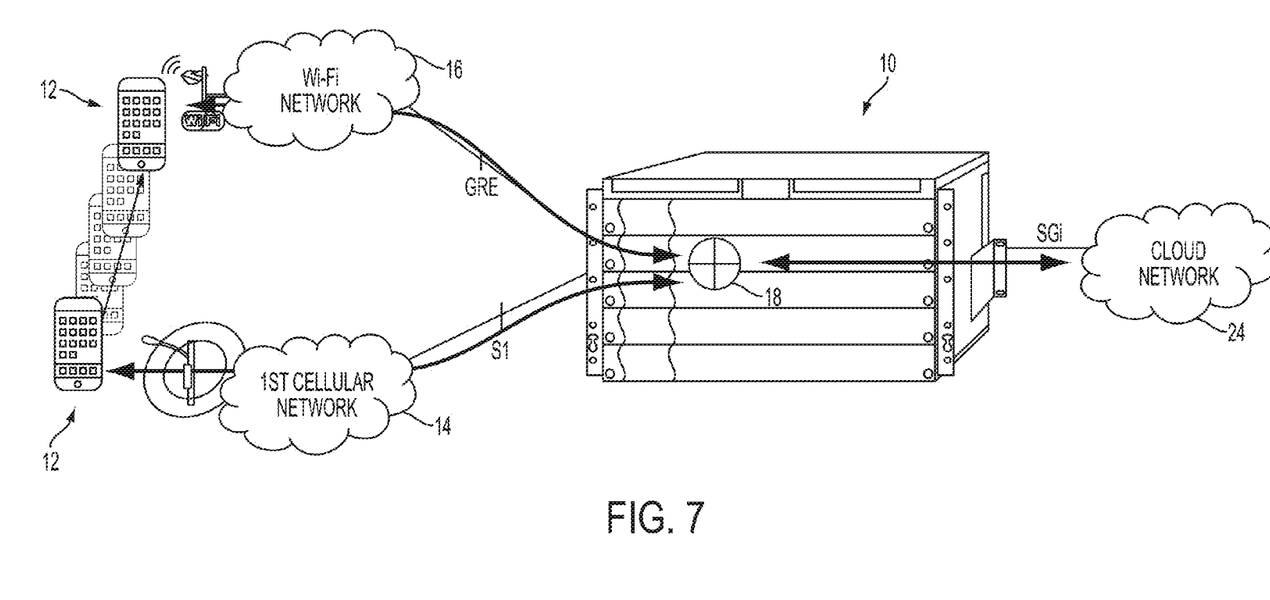
FIG. 7 is a schematic illustration of a combination cellular and Wi-Fi hardware device switching between a Wi-Fi network and a cellular network to provide data flow between a cloud computing infrastructure network and a mobile device, according to one aspect of the present invention.
Figure 8:
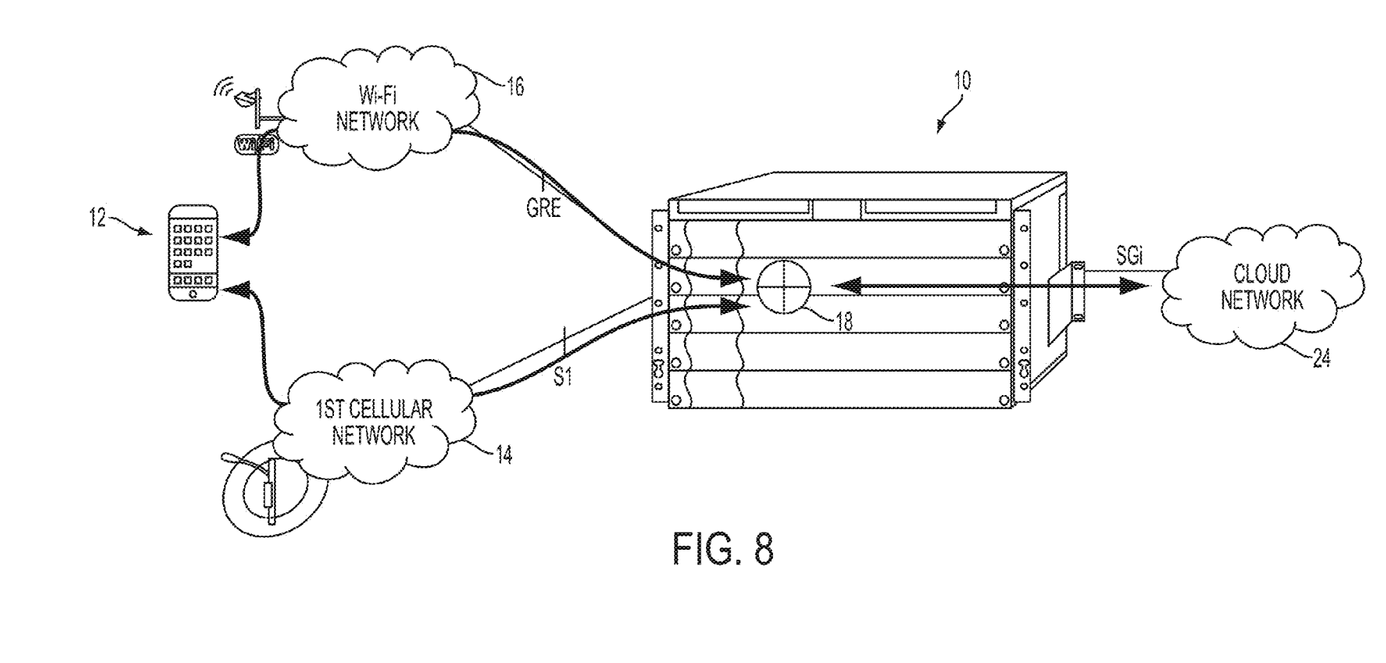
FIG. 8 is a schematic illustration of a combination cellular and Wi-Fi hardware device providing data flow between a cloud computing infrastructure network and a mobile device utilizing a cellular network and a Wi-Fi network concurrently, according to one aspect of the present invention.

FIGS. 7 and 8 depict two example implementations of the combination cellular and Wi-Fi hardware device 10 providing data from a cloud computing infrastructure network 24 to a mobile device 12. In both implementations, the IP interface 18 functions as the common anchor point whether communication is with the first cellular network 14 and/or the Wi-Fi network.

In the FIG. 7 example, data is provided to a mobile device 12 switching between the first cellular network 14 and Wi-Fi network 16, and vice versa. As described above, the combination cellular and Wi-Fi hardware device 10 is enabled to maintain communication during this switching process (e.g., switching between S1 port and GRE port, and vice versa). The combination cellular and Wi-Fi hardware device 10 can provide ultra-fast layer 2 (L2) mobility (i.e., switching) which causes less latency and less jitter. In one example, this ultra-fast mobility by the combination cellular and Wi-Fi hardware device 10 between a first cellular network 14 and a Wi-Fi network 16 can occur at about 50 µs or less. Providing ultra-fast mobility allows for single sign-on (e.g., extensible authentication protocol (EAP) subscriber identity module (SIM)/authentication and key agreement (AKA)). Thus, the combination cellular and Wi-Fi hardware device 10 can provide seamless and fast handover between a first cellular network 14 and a Wi-Fi network 16.

In the FIG. 8 example, data is provided to a mobile device 12 utilizing the first cellular network 14 and the Wi-Fi network 16 concurrently (i.e., Wi-Fi/cellular carrier aggregation—bounding of two connections). In particular, the combination cellular and Wi-Fi hardware device 10 can communicate with the mobile device 12 using both the Wi-Fi network 16 and a first cellular network 14 (e.g., LTE-A protocol network). This allows for the combination cellular and Wi-Fi hardware device 10 to provide data at ultra-broadband speed. In one example, the mobile device 12 can use the data flow as a multipack connection where data flow via the Wi-Fi network 16 is used for one set of processes (e.g., music application) and the data flow via the first cellular network 14 is used for a second set of processes (e.g., social media application). In one Wi-Fi/cellular carrier aggregation example, control of all mobile device wireless communication and data flow can be carried via the S1 portal along the first cellular network 14.

Figure 9:
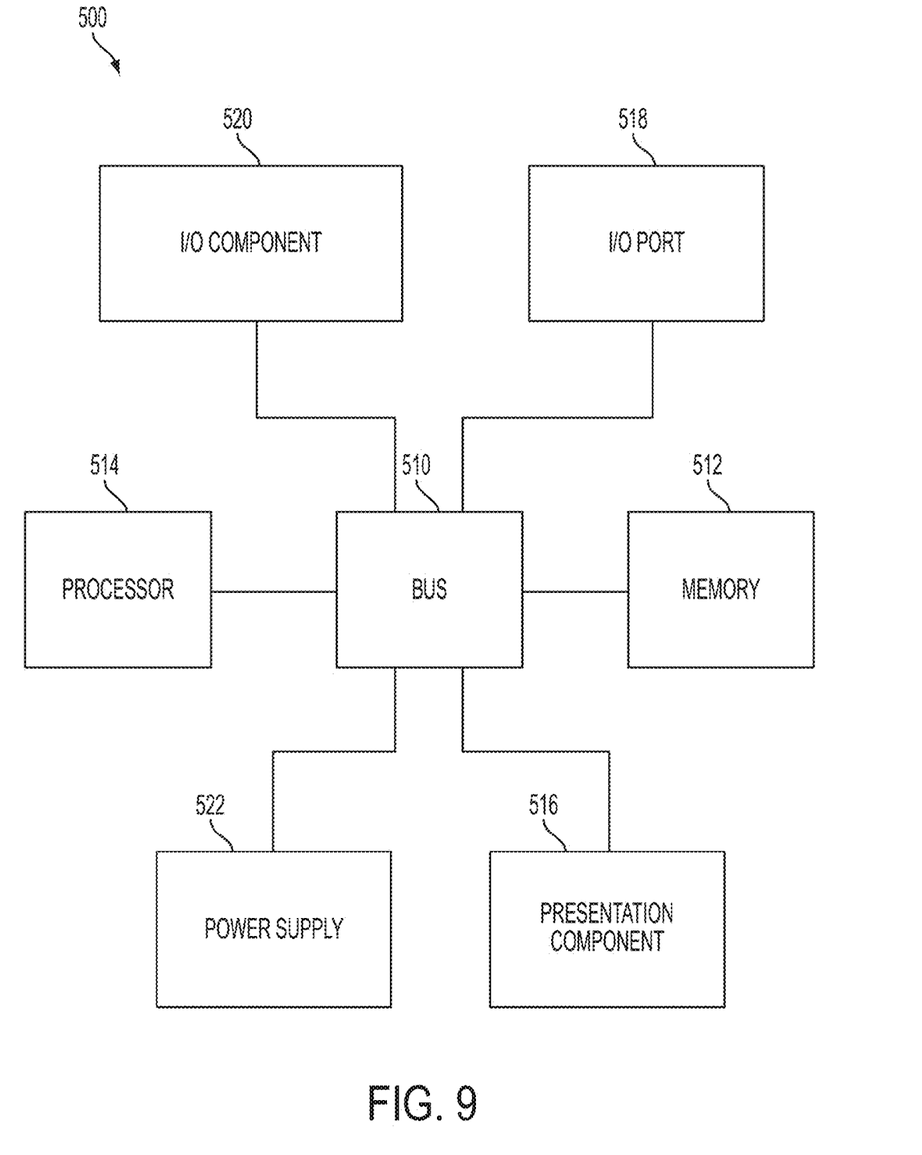
FIG. 9 is a schematic view of a computing device or system, suitable for implementing the systems and methods of the present invention.

FIG. 9 illustrates an example of a computing device 500 which can provide computing or processing functionality for the combination cellular and Wi-Fi hardware device 10 and any other processing functionality described herein and utilized in the implementation of aspects of the illustrative methods and systems of the present invention. The computing device 500 is merely an illustrative example of a suitable computing environment and in no way limits the scope of the present invention. A "computing device," as represented by FIG. 9, can include a "workstation," a "server," a "laptop," a "desktop," a "hand-held device," a "mobile device," a "tablet computer," or other computing devices, as would be understood by those of skill in the art. Given that the computing device 500 is depicted for illustrative purposes, embodiments of the present invention may utilize any number of computing devices 500 in any number of different ways to implement a single embodiment of the present invention. Accordingly, embodiments of the present invention are not limited to a single computing device 500, as would be appreciated by one with skill in the art, nor are they limited to a single type of implementation or configuration of the example computing device 500.

The computing device 500 can include a bus 510 that can be coupled to one or more of the following illustrative components, directly or indirectly: a memory 512, one or more processors 514, one or more presentation components 516, input/output ports 518, input/output components 520, and a power supply 522. One of skill in the art will appreciate that the bus 510 can include one or more busses, such as an address bus, a data bus, or any combination thereof. One of skill in the art additionally will appreciate that, depending on the intended applications and uses of a particular embodiment, multiple components can be implemented by a single device. Similarly, in some instances, a single component can be implemented by multiple devices. As such, FIG. 9 is merely illustrative of an exemplary computing device that can be used to implement one or more embodiments of the present invention, and in no way limits the invention.

The computing device 500 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 500.

The memory 512 can include computer-storage media in the form of volatile and/or nonvolatile memory. The memory 512 can be removable, non-removable, or any combination thereof. Exemplary hardware devices are devices such as hard drives, solid-state memory, optical-disc drives, and the like. The computing device 500 can include one or more processors 514 that read data from components such as the memory 512, the various I/O components 520, etc. Presentation component(s) 516 present data indications to a user or other device. Exemplary presentation components 516 include a display device, speaker, printing component, vibrating component, etc. The I/O ports 518 can allow the computing device 500 to be logically coupled to other devices, such as I/O components 520. Some of the I/O components 520 can be built into the computing device 500. Examples of such I/O components 520 include a microphone, joystick, recording device, game pad, satellite dish, scanner, printer, wireless device, Bluetooth® device, networking device, and the like.

One of skill in the art will appreciate a wide variety of ways to modify and alter the device and method of FIGS. 1-9, as well as the various components with which it interacts. For example, the one or more computing systems can be implemented according to any number of suitable computing system structures. Furthermore, some or all of the information contained in the one or more data sources alternatively can be stored in one or more remote databases (e.g., cloud computing infrastructure such as cloud databases, virtual databases, and any other remote database).

In some embodiments, it may be desirable to implement the method and device using multiple iterations of the depicted modules, controllers, and/or other components, as would be appreciated by one of skill in the art. Furthermore, while some modules and components are depicted as included within the system, it should be understood that, in fact, any of the depicted modules alternatively can be excluded from the system and included in a different system. One of skill in the art will appreciate a variety of other ways to expand, reduce, or otherwise modify the system upon reading the present specification.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A combination cellular and Wi-Fi hardware device, comprising: an IP interface configured for communication with a first cellular network, a Wi-Fi network, or both;
   the combination cellular and Wi-Fi hardware device providing, by a processor, network functionality required to facilitate communication and data flow between the IP interface and either a second cellular network, or a cloud computing infrastructure network;
   wherein the IP interface is accessed using a single IP address by a mobile device in wireless communication with the combination cellular and Wi-Fi hardware device; and wherein the single IP address is maintained when the mobile device switches between utilizing the first cellular network and the Wi-Fi network to communicate with the combination cellular and Wi-Fi hardware device, and vice versa;

wherein the IP interface acting as a common anchor point, and the single IP address for both the first cellular network and the Wi-Fi network enables simultaneous communication with the first cellular network and the Wi-Fi network; and wherein switching between utilizing the first cellular network and the Wi-Fi network occurs at 50 microseconds of less.

2. The combination cellular and Wi-Fi hardware device of claim 1, wherein the first cellular network is a long term evolution (LTE) radio access network (RAN).

3. The combination cellular and Wi-Fi hardware device of claim 1, wherein the first cellular network is provided by an evolved NodeB antenna.

4. The combination cellular and Wi-Fi hardware device of claim 1, wherein the IP interface comprises an interworking function module configured to direct and interwork communication from the first cellular network to a cellular and Wi-Fi control plane module of the IP interface.

5. The combination cellular and Wi-Fi hardware device of claim 1, wherein the IP interface comprises a cellular and Wi-Fi control plane module configured to receive communication from the Wi-Fi network.

6. The combination cellular and Wi-Fi hardware device of claim 1, wherein the mobile device utilizes the first cellular network and the Wi-Fi network concurrently to facilitate communication and data flow between the combination cellular and Wi-Fi hardware device and the mobile device.

7. The combination cellular and Wi-Fi hardware device of claim 1, wherein the second cellular network comprises a 3G radio access network.

8. The combination cellular and Wi-Fi hardware device of claim 1, wherein the cloud computing infrastructure network comprises an Internet provider network.

9. The combination cellular and Wi-Fi hardware device of claim 1, wherein the IP interface comprises an authenticating module that authenticates the single IP address of the mobile device such that when the mobile device switches between utilizing the first cellular network and the Wi-Fi network, or vice versa, no additional authentication is required.

10. The combination cellular and Wi-Fi hardware device of claim 1, wherein the IP interface comprises a fast path module configured to provide a common fast path for communication and data flow along both the first cellular network and the Wi-Fi network.

11. The combination cellular and Wi-Fi hardware device of claim 1 further comprising one or more of virtualized network modules that provide the network functionality of a mobility management entity (MME), a serving gateway (S-GW), a trusted wireless access gateway (T-WAG), a packet data network gateway (P-GW), a traffic detection function (TDF), a authentication, authorization, and accounting protocol (AAA) server, a home subscriber server (HSS), a policy and charging rules function (PCRF) server, an online charging server (OCS), and a charging gateway function (CFG) server.

12. The combination cellular and Wi-Fi hardware device of claim 4, wherein the cellular and Wi-Fi control plane module is a generic IP signaling protocol module configured to assign the single IP address to the mobile device.

13. The combination cellular and Wi-Fi hardware device of claim 4, wherein the IP interface comprises a wireless application gateway (WAG) manager module in communication with the interworking function module.

14. The combination cellular and Wi-Fi hardware device of claim 6, wherein the first cellular network comprises an LTE-Advanced protocol network.

15. A computer implemented method of using a combination cellular and Wi-Fi hardware device to provide for communication and data flow with a mobile device, comprising:

an IP interface of the combination cellular and Wi-Fi hardware device communicating with a first cellular network, a Wi-Fi network, or both;

the mobile device accessing the IP interface using a single IP address;

the mobile device wirelessly communicating with the combination cellular and Wi-Fi hardware device;

the combination cellular and Wi-Fi hardware device providing, by a processor, network functionality facilitating communication and data flow between the IP interface and either a second cellular network, or a cloud computing infrastructure network;

the combination cellular and Wi-Fi hardware device maintaining the single IP address when the mobile device switches between utilizing the first cellular network and the Wi-Fi network to communicate with the combination cellular and Wi-Fi hardware device, and vice versa;

wherein the IP interface acting as a common anchor point, and the single IP address for both the first cellular network and the Wi-Fi network enables simultaneous communication with the first cellular network and the Wi-Fi network; and wherein switching between utilizing the first cellular network and the Wi-Fi network occurs at 50 microseconds of less.

* * * * *